(12) United States Patent
Roychoudhury

(10) Patent No.: US 9,327,668 B1
(45) Date of Patent: May 3, 2016

(54) CORRUGATED WELD SEAM FOR ACTIVE BOLSTER

(71) Applicant: FORD GLOBAL TECHNOLOGIES, LLC, Dearborn, MI (US)

(72) Inventor: Raj S. Roychoudhury, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/607,182

(22) Filed: Jan. 28, 2015

(51) Int. Cl.
*B60R 21/04* (2006.01)
*B29D 22/02* (2006.01)
*B60R 21/231* (2011.01)
*B60R 21/235* (2006.01)
*B29D 99/00* (2010.01)
*B60R 13/02* (2006.01)
*B29K 101/12* (2006.01)

(52) U.S. Cl.
CPC ............... *B60R 21/04* (2013.01); *B29D 22/02* (2013.01); *B29D 99/001* (2013.01); *B60R 13/02* (2013.01); *B60R 21/231* (2013.01); *B60R 21/235* (2013.01); *B29K 2101/12* (2013.01); *B60R 2013/0287* (2013.01); *B60R 2021/0407* (2013.01); *B60R 2021/2359* (2013.01); *B60R 2021/23519* (2013.01); *B60R 2021/23557* (2013.01); *B60R 2021/23571* (2013.01)

(58) Field of Classification Search
CPC .... B60R 21/04; B60R 21/235; B60R 21/231; B60R 13/02; B60R 2021/2359; B60R 2021/23571; B60R 2021/23519; B60R 2013/0287; B60R 2021/23557; B60R 2021/0407; B29D 22/02; B29D 99/001; B29K 2101/12
See application file for complete search history.

(56) References Cited

U.S. PATENT DOCUMENTS

| 6,726,790 | B2 | 4/2004 | Kagan et al. | |
| 8,448,985 | B2 | 5/2013 | Kalisz | |
| 8,474,868 | B2 * | 7/2013 | Kalisz | B60R 13/02 280/728.3 |
| 8,544,876 | B2 * | 10/2013 | Best | B60R 21/02 280/730.1 |
| 8,579,325 | B2 * | 11/2013 | Roychoudhury | B60R 21/02 280/752 |
| 8,720,948 | B2 * | 5/2014 | Raines | B60R 21/04 280/728.3 |
| 9,120,450 | B1 * | 9/2015 | Aselage | B60R 21/205 |
| 9,254,807 | B1 * | 2/2016 | Aselage | B60R 21/04 |
| 2006/0131844 | A1 * | 6/2006 | Trevino | B60R 21/2165 280/728.3 |
| 2006/0255569 | A1 * | 11/2006 | Weissert | B60R 21/216 280/728.3 |
| 2008/0100038 | A1 * | 5/2008 | Finch | B60H 1/0055 280/728.2 |
| 2011/0272926 | A1 * | 11/2011 | Roychoudhury | B60R 21/235 280/728.2 |
| 2012/0248741 | A1 * | 10/2012 | Kalisz | B60R 21/04 280/728.2 |
| 2012/0267878 | A1 * | 10/2012 | Kalisz | B60R 13/02 280/728.2 |

* cited by examiner

*Primary Examiner* — Drew Brown
(74) *Attorney, Agent, or Firm* — Vichit Chea; MacMillan, Sobanski & Todd, LLC

(57) ABSTRACT

An active bolster is provided for an interior trim surface of an automotive vehicle. A plastic-molded outer trim panel has a welding track on an inside surface. A plastic-molded expandable bladder member has a central attachment section configured to attach to a support structure of the vehicle, a welding flange along a peripheral edge with a first surface facing the trim panel inside surface and a second opposed surface, and a pleated region between the central attachment section and the welding flange. The welding track and the welding flange are joined by a closed-loop hot weld seam to form a sealed chamber. The welding track and welding flange comprise complementary surfaces having a plurality of corrugations making the weld seam at least partially shaped as an undulating ribbon. As a result, a majority of the forces on the weld seam during inflation are in shear instead of peel.

18 Claims, 8 Drawing Sheets

US 9,327,668 B1

CORRUGATED WELD SEAM FOR ACTIVE BOLSTER

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates in general to active bolsters for occupant crash protection in automotive vehicles, and, more specifically, to increasing robustness of the bonding between an expandable bladder member and a trim wall which are separately molded and then hot welded together.

An active bolster is a vehicle occupant protection device with a gas-inflatable bladder to absorb impacts and reduce harm to occupants during a crash. As opposed to deployable air bag cushions that emerge from behind various openings upon inflation, active bolsters use the interior trim surface itself to expand at the beginning of a crash event for absorbing the impact and dissipating energy through deflation of the bladder. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes an outer wall or trim panel that faces a vehicle occupant attached to an inner wall or panel along a sealed periphery. One or both of the walls is deformable in order to provide an inflatable bladder. For example, the inner wall (i.e., bladder wall) may have a pleated (i.e., accordion-like) region that straightens out during inflation.

The inner and outer walls of a typical active bolster are comprised of molded thermoplastics such as polyethylene, polyolefin, or PVC. They are typically injection molded but could also be blow molded. When formed separately, the walls must be hermetically joined around their periphery in order to form the inflatable bladder. The joint must be strong to resist separation as a result of the high pressures during inflation and occupant impact.

A known method of sealing the bladder walls is by hot welding, which involves heating of the matching surfaces and then compressing them together. Examples include hot plate welding, IR welding, and laser welding. A generally planar welding flange has been provided around the outer perimeter of an inner (bladder) wall which is received by a generally planar surface of an outer (trim) wall. The outer wall and/or inner surfaces may also include upstanding welding ribs that increase the weld strength by penetrating and fusing with the welding flange or other opposing surface during the hot welding process in which the areas to be welded are heated and then compressed. Despite the penetration of these ribs, weld separation has continued to be a potential weakness for active bolsters for various reasons including warping of the parts to be welded, temperature variations of the hot plates during welding, uncorrected variances in the pressure applied during welding, and characteristic differences between the trim wall and bladder wall which may be molded from different plastic formulations.

Various stresses during inflation contribute to the possibility of weld separation. Due to the elasticity required for making the pleated bladder wall inflatable and the orientation of the hot weld seam, a significant peel stress may be applied to the weld seam during expansion. More specifically, the typical orientation of the weld seam involves a generally planar sheet which extends perpendicularly with respect to the outward expansion direction of the bolster. As the pleats on the bladder member unfold and the trim panel moves outward, the inner edge of the weld seam tends to be pulled apart by a peeling force. The weld seam may typically withstand greater forces in the shear direction (i.e., directed along the plane of the weld seam) than in the peel direction. However, the conventional orientation of the weld seam has advantages in cost and ease of manufacturing.

SUMMARY OF THE INVENTION

In one aspect of the invention, an active bolster is provided for an interior trim surface of an automotive vehicle. A plastic-molded outer trim panel has a welding track on an inside surface. A plastic-molded expandable bladder member has a central attachment section configured to attach to a support structure of the vehicle, a welding flange along a peripheral edge with a first surface facing the trim panel inside surface and a second opposed surface, and a pleated region between the central attachment section and the welding flange. The welding track and the welding flange are joined by a closed-loop hot weld seam to form a sealed chamber. The welding track and welding flange comprise complementary surfaces being slanted to add a shear force component. In a preferred embodiment, the surfaces have a plurality of corrugations making the weld seam at least partially shaped as an undulating ribbon.

DETAILED DESCRIPTION OF PREFERRED EMBODIMENTS

Figure 1:
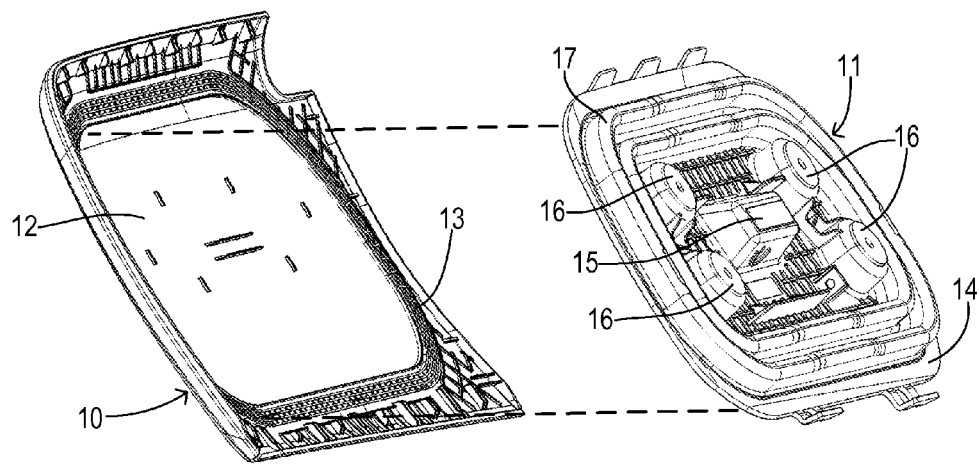
FIG. 1 is a perspective, exploded view of a prior art active bolster assembly including a trim panel front wall and back bladder wall.
Figure 2:
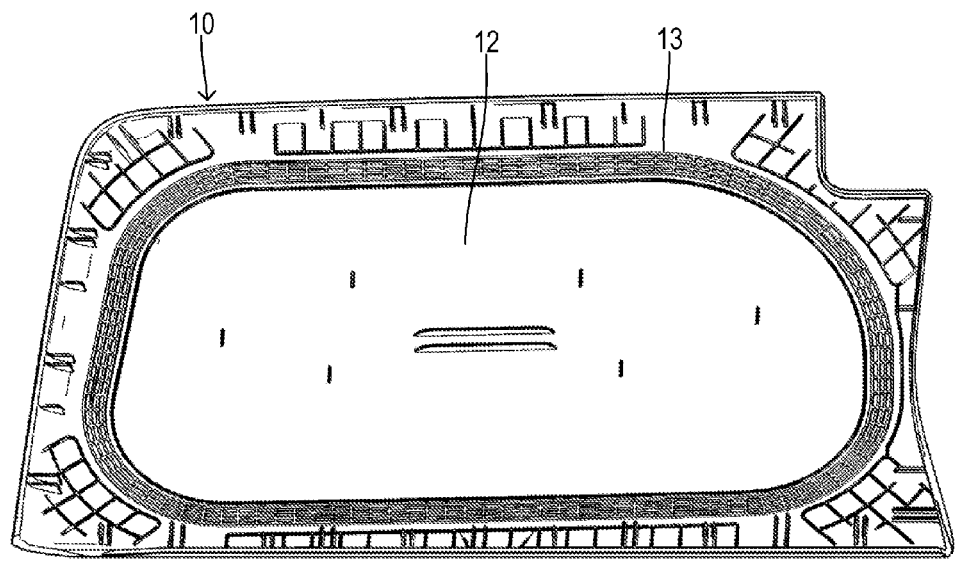
FIG. 2 is a rear perspective view of an inside surface of the trim panel front wall of FIG. 1.
Figure 3:
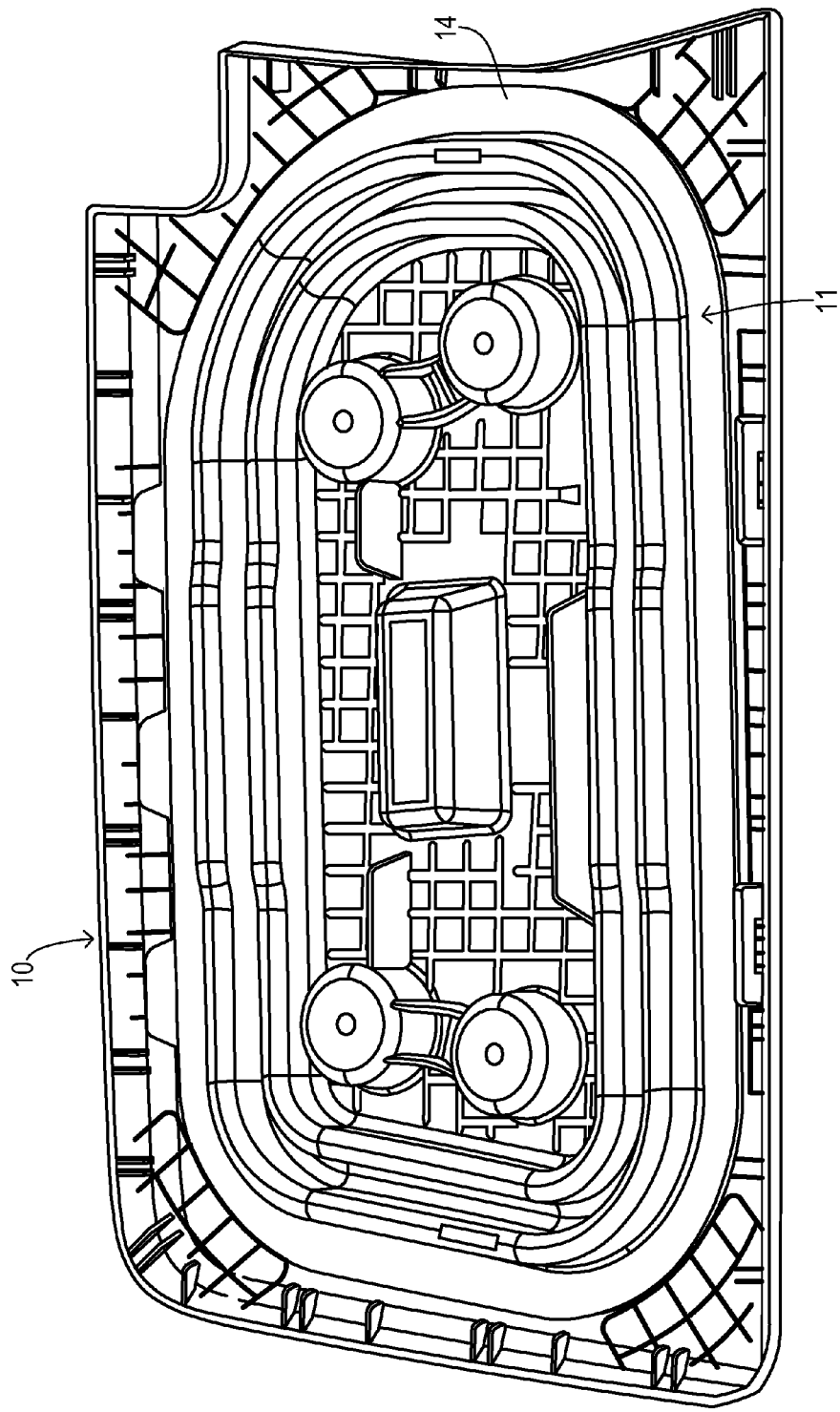
FIG. 3 is a rear perspective view showing a prior art bladder member assembled via hot welding to the trim panel of FIG. 2.

FIGS. 1-3 show a prior art active bolster formed as an interior trim panel which is part of a glove box door in an automotive vehicle. More specifically, a trim panel 10 functions as a front trim wall which receives an expandable bladder wall 11. Panel 10 has an inside surface 12 with a welding track or raceway 13 preferably formed as a rib that extends upward from the inside surface in order to bond with an outer flange 14 of bladder wall 11 (e.g., by plastic welding such as hot plate welding).

Bladder wall 11 has a recess 15 near the center for mounting an inflator (not shown) and a plurality of mounting towers 16 provided in a central attachment section for attaching the assembly to a reaction surface, such as an inner panel of the glove box door (not shown). A pleated region 17 is formed between towers 16 and outer flange 14 so that a series of pleats can unfold during inflation in a manner that allows trim panel 10 to displace toward the passenger cabin to cushion an impacting passenger.

Hot welding of track 13 and flange 14 creates a bladder cavity for receiving inflation gas from the inflator. During the hot welding operation, a hot plate, laser, or other heat source are used to melt plastic material of track 13 and flange 14, and after the heat source is removed then track 13 and flange 14 are pressed together and cooled so that the melted materials intermix and become welded together, resulting in an assembly shown in FIG. 3.

Figure 4:
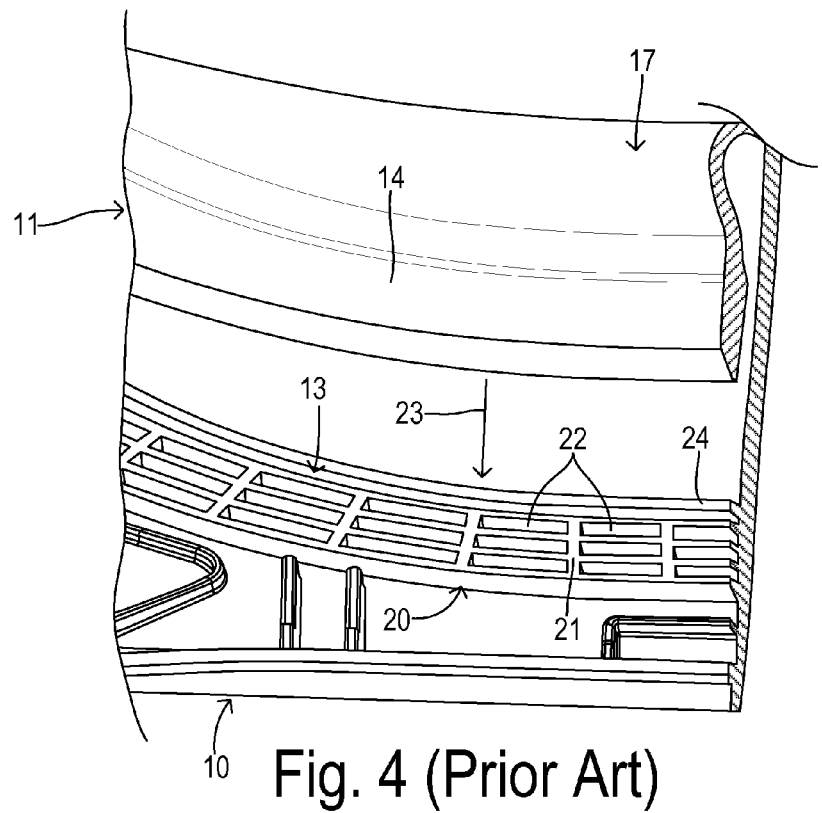
FIG. 4 is an exploded, partial perspective view showing the prior art welding track and welding flange in greater detail.

FIG. 4 shows the surfaces for forming a hot weld seam in greater detail. Welding track 13 may preferably be comprised of a raised block 20 extending radially around the periphery of a sealed chamber to form a closed loop weld seam. Block 20 has an upper surface 21 defining a substantially flat plane to be joined with a facing surface of welding flange 14. Raised bar 20 may include a plurality of recessed pits 22 for increasing interpenetration between welding track 13 and welding flange 14 during hot welding. After sufficient heating, the complementary surfaces of track 13 and flange 14 are compressed together in the direction of arrow 23 to form the hot weld seam. Due to the generally flat, planar shape of one or both surfaces, the resulting weld seam has the form of a flat, planar ribbon extending peripherally (i.e., radially) around the bolster. A raised rib 24 may be provided on an interior side of the hot weld seam in order to shield the weld seam from direct incursion of inflation gas during the initial stages of inflation.

Figure 5:
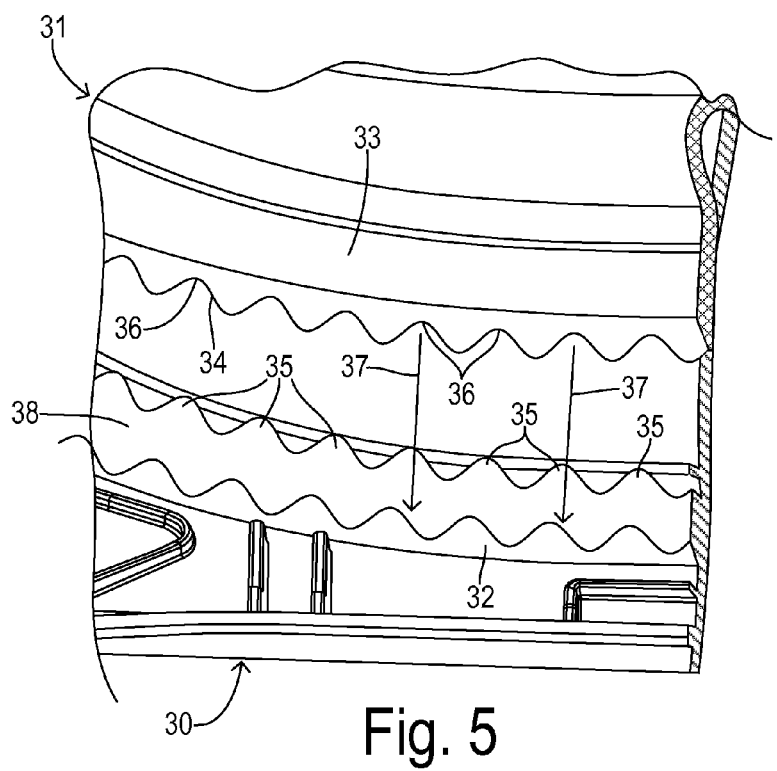
FIG. 5 is an exploded, partial perspective view showing a welding track and welding flange of one embodiment of the present invention.

An improved weld seam of the present invention may be obtained in the shape of an undulating ribbon by using corrugated hot weld surfaces as shown in FIG. 5. Thus, an outer trim panel 30 is joined to a expandable bladder 31 along a closed loop hot weld seam formed between a welding track 32 and a matching welding flange 33, wherein welding track 32 has an inside surface 38 including corrugations 35 and welding flange 33 has a surface 34 including corrugations 36. Corrugations 35 and 36 are complementary so that they may be joined along the direction of arrows 37. Complementary surfaces 38 and 34 become nested together during the hot welding compression step to thereby form a weld seam that is at least partially shaped as an undulating ribbon.

Figure 6:
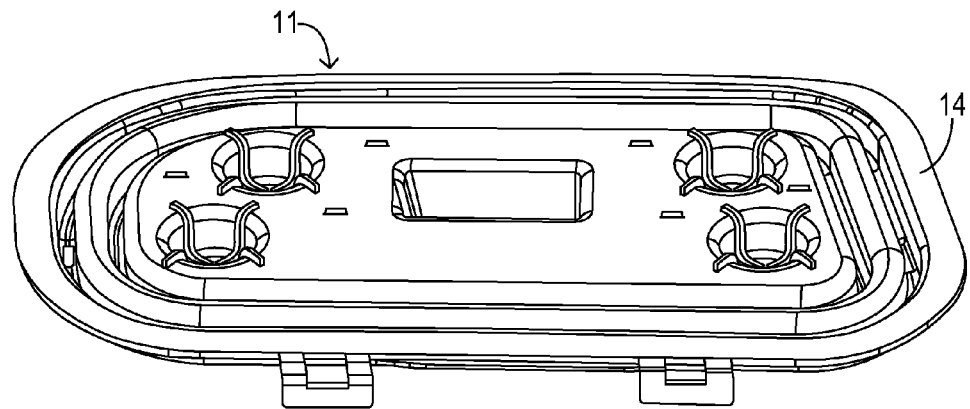
FIG. 6 is a perspective view showing an inside surface of the prior art bladder member of FIG. 1.
Figure 7:
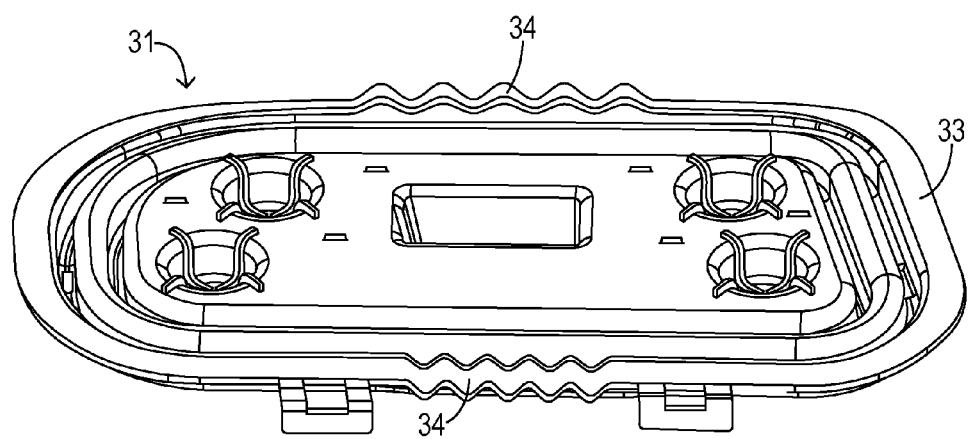
FIG. 7 is a perspective view showing an inside surface of one embodiment of a bladder member of the invention.

During hot welding, heat applied to surfaces 38 and 34 creates a melted surface layer on each component. The melted layers fuse during compression in order to form the undulating ribbon weld seam. Corrugations may preferably extend completely around the periphery of the closed loop welding track and welding flange. Alternatively, the corrugated portion may extend only over a smaller radial portion of the closed loop welding seam, such as at regions where the highest weld stress results during inflation. FIG. 6 shows a flat welding flange 14 on bladder member 11 which results in a hot weld seam being a flat, planar ribbon. FIG. 7 shows one embodiment of bladder member 31 of the present invention wherein corrugations 34 on welding flange 33 extend only over a portion of the full peripheral circumference. For the portion of the weld seam having corrugations, the present invention ensures that a majority of the weld seam extends non-perpendicularly to the direction of gas expansion of the bladder chamber (i.e., because the surfaces along the corrugations are not parallel with the main orientation of the panels). Thus, a separating force vector caused by bladder expansion acting on the weld seam in the corrugated regions has a component acting in the shear direction due to the reorientation of the weld seam away from being perpendicular to the force vector. A component of the force continues to act as a peel force, but the application of some of the force as a shear force significantly improves the overall weld strength.

The action of a peeling force would be characterized by a bending of the welding flange or welding track. A corrugated weld seam of the invention increases the stiffness of the welding flange and/or welding track so that the bending is resisted, which results in a further increase of the overall weld strength.

Figure 8:
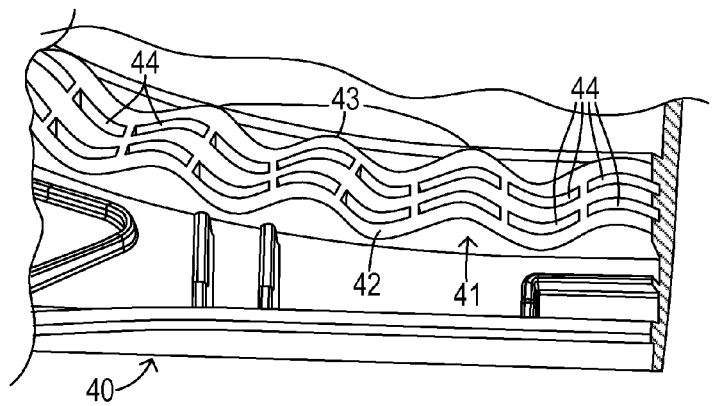
FIG. 8 is a partial perspective view showing another embodiment of a corrugated welding track of the invention including pits in the corrugations.
Figure 9:
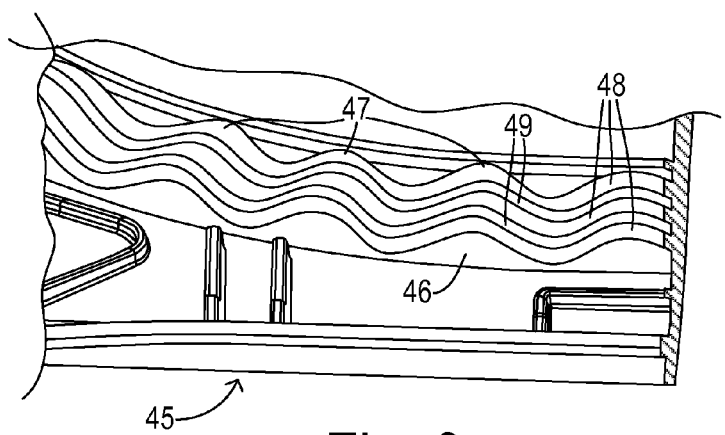
FIG. 9 is a partial perspective view showing another embodiment of a corrugated welding track of the invention including radial ribs within the corrugations.

Preferably, the corrugations may have a continuously changing slope, such as with the sinusoidally-shaped corrugation profile shown in FIGS. 5 and 7. A smooth undulating surface as shown in FIG. 5 may be modified to include pits or ribs. As shown in FIG. 8, outer trim panel 40 has a welding track 41 with an inside surface 42 following a sinusoidal profile with corrugations 43. A plurality of pits 44 are sunk into surface 42 to increase the interpenetration of the melted plastic surfaces during hot welding. Similarly, FIG. 9 shows an outer trim panel 45 with welding track 46 having corrugations 47. An inside surface 48 defining the undulating ribbon surface may be interrupted by troughs 49. Thus, welding track 46 being formed as a plurality of ribs for increasing penetration into the matching, complementary surface of the welding flange (not shown). It should be noted, however, that only the upper surfaces of ribs which are heated by the hot plate or other heat source during hot welding actually melt and form part of the hot weld (i.e., the side surfaces of the ribs do not melt and do not form a hot weld). Thus, prior art hot weld seams using ribs produced flat weld seams.

Figure 10:
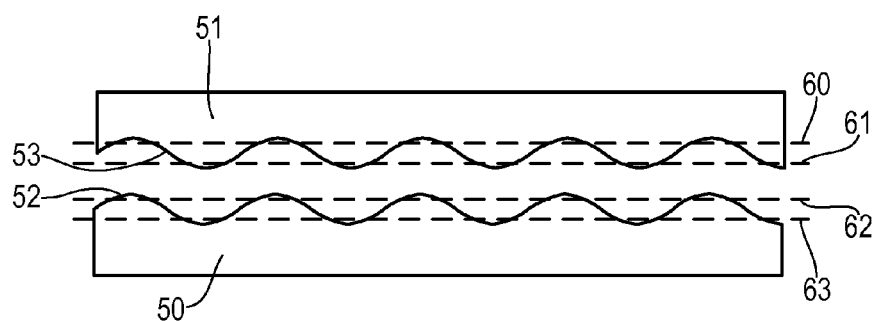
FIG. 10 shows a sinusoidal profile for one embodiment of the complementary surfaces of the welding track and flange.

FIG. 10 shows a cross section of a preferred sinusoidal profile wherein welding track 50 and welding flange 51 have complementary surfaces 52 and 53, respectively. The sinusoidal corrugation profile has a continuously changing slope. The conversion of the inflation force vector into a shear force varies along the profile in proportion to the variance of the slope away from being perpendicular to the force vector. The conversion is least at the peaks and valleys of the sinusoidal corrugations and highest at the zero crossings.

Figure 11:
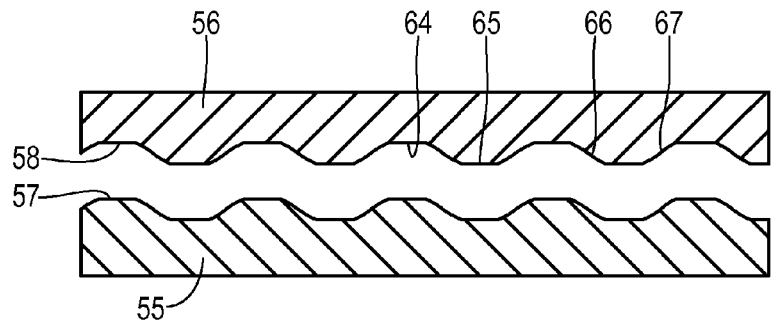
FIG. 11 shows a substantially sinusoidal profile with truncated peaks and valleys.

Weld strength can still be improved even when only a portion of the profile has a slope which is non-perpendicular to the separation force vector. For example, FIG. 11 shows a substantially sinusoidal corrugation profile wherein the peaks and valleys of the sinusoids are truncated. More specifically, welding track 55 and welding flange 56 have complementary surfaces 57 and 58. The sinusoidal profile of FIG. 10 has been cropped according to flat boundary planes 60 and 61 for welding flange 51 and boundary planes 62 and 63 for welding track 50. Truncating the sinusoidal profile using planes 60 and 61, results in flat peaks and valleys 64 and 65, for example. Sinusoidal sections 66 and 67 of the profile continue to provide added strength by virtue of being non-perpendicular to the inflation force vector.

Figure 12:
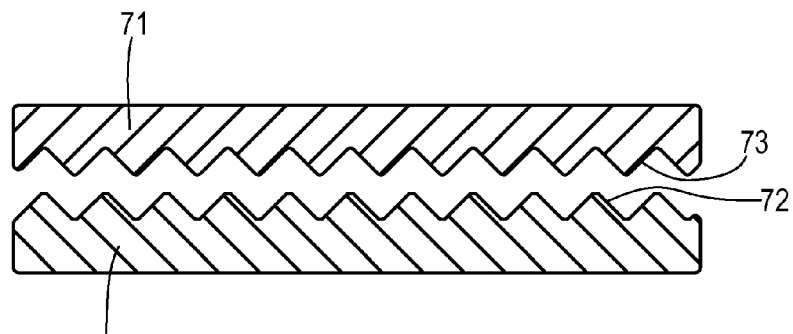
FIG. 12 shows a substantially triangular profile for corrugations formed as triangular prisms.

FIG. 12 shows another profile wherein welding track 70 and welding flange 71 have triangular cross-sections at complementary surfaces 72 and 73. The resulting corrugations are shaped as triangular prisms. The proportion of shear force to peel force acting along the hot weld seam using the profile of FIG. 12 depends on a chosen steepness in the triangular cross-sections. The hot weld process, however, may impose limitations on the steepness of the triangular profile due to the need for effective melting along the entire surface.

Figure 13:
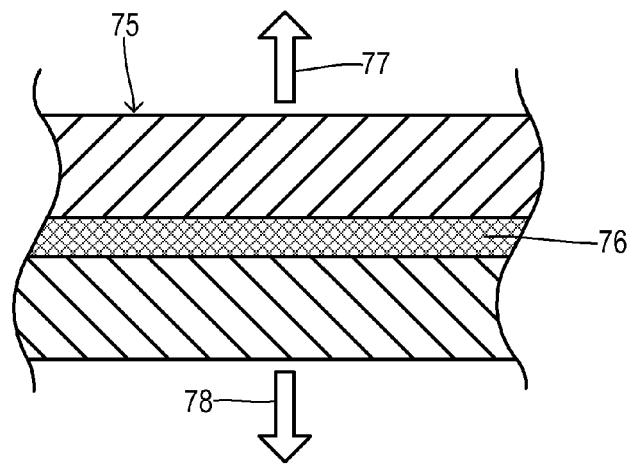
FIG. 13 is a longitudinal weld cross section showing peel forces as applied to a prior art weld seam formed as a flat ribbon.
Figure 14:
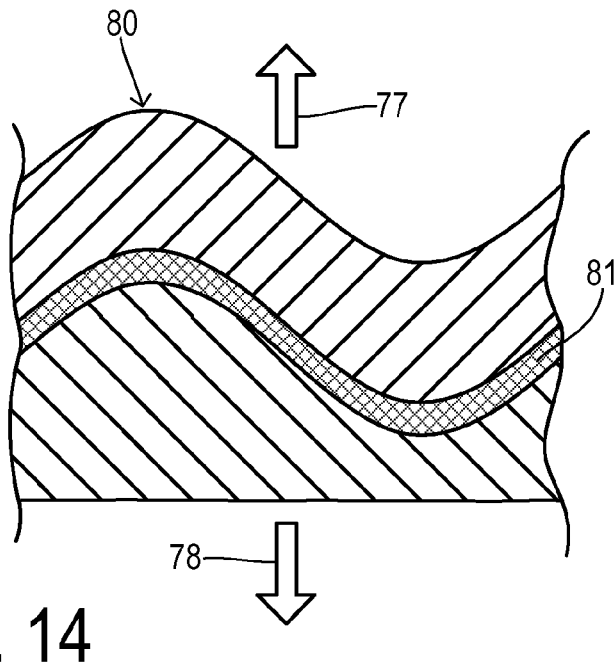
FIG. 14 is a longitudinal weld cross section of weld seam with a sinusoidal, undulating ribbon shape wherein inflation stresses are converted at least partially into shear forces.
Figure 15:
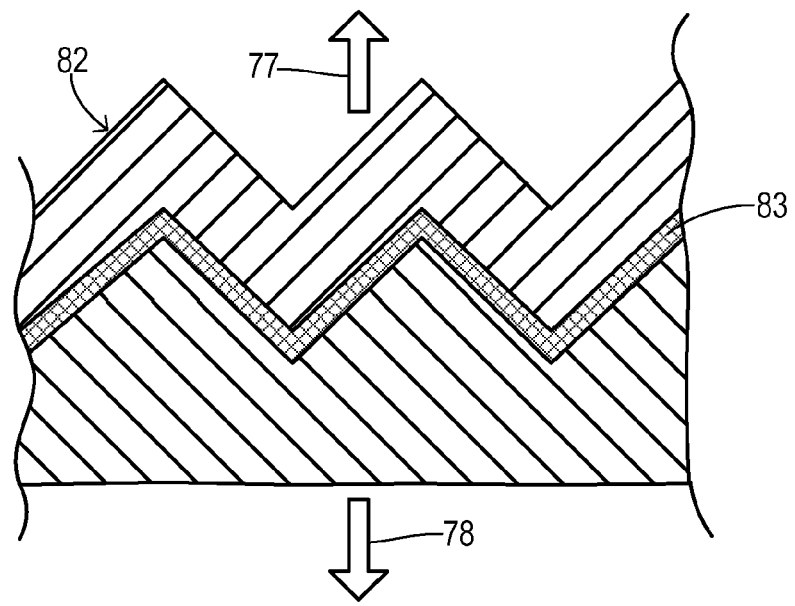
FIG. 15 is a longitudinal weld cross section of a weld seam with a triangular, undulating ribbon shape wherein inflation stresses are converted at least partially into shear forces.

The conversion of inflation forces from being a peel force into a shear force is shown in FIGS. 13-15. Thus, a welded assembly 75 has a prior art weld seam 76 forming a flat planar ribbon in FIG. 13. Separation forces 77 and 78 are applied fully perpendicularly to weld seam 76 resulting in a full peel force and no shear force. In FIG. 14, a welded assembly 80 has an undulating-ribbon hot weld 81 following a sinusoidal profile. Separation forces 77 and 78 act upon the weld seam 81 as a combination of peel and shear forces along the majority of undulating weld seam 81. More specifically, the farther the slope of weld seam 81 is from being perpendicular to forces 77 and 78 (i.e., the closer the slope of weld seam 81 is to being parallel with the direction of forces 77 and 78), the greater the proportion that the forces act as a sheer force. Likewise, a welded component 82 in FIG. 15 has a hot weld seam 83 following a triangular profile. The corrugations formed as triangular prisms generates a large and consistent improvement in weld strength by converting a greater proportion of forces to shear forces instead of peel forces.

In addition to the conversion of peel forces to shear forces from the corrugations, the present invention increases total weld area of the weld seam due to the increased overall length of the undulating ribbon. Moreover, the weld seam is stiffened to resist peeling, and the increased weld strength is obtained without significant addition in mass and without added components.

Figure 16:
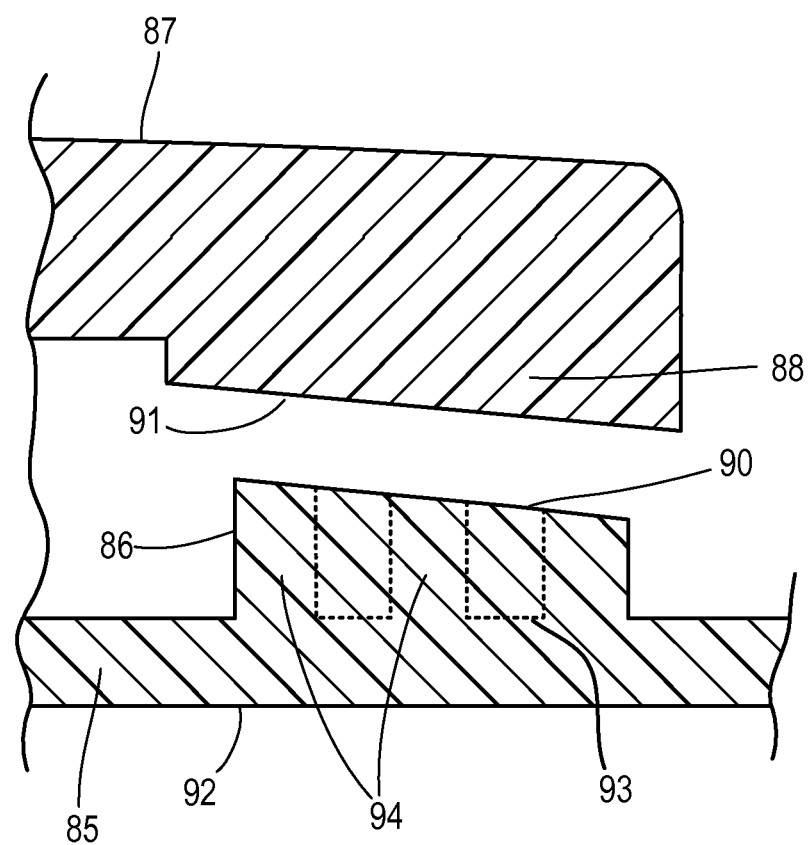
FIG. 16 is a radial cross section of a trim panel and bladder member to be welded which shows a radially slanted welding surface in another embodiment for adding a shear force component.

The corrugations discussed above provide a wavy or flat slant along the longitudinal direction of the weld seam. FIG. 16 is a radial cross section (i.e., perpendicular to the longitudinal elongation of the weld seam) of another embodiment wherein a weld seam having a slanted radial profile is created. The weld seam could be either corrugated or not corrugated in the longitudinal direction. If not corrugated, the slanted radial profile still converts some of the peel forces into shear forces. More specifically, a front trim panel 85 having a weld track 86 is assembled to a bladder member 87 having a weld flange 88. Facing surfaces 90 and 91 of weld track 86 and weld flange 88 are complementary and define a profile that is radially slanted with respect to a front surface 92 of trim panel 85.

The slanted profile of FIG. 16 can also be implemented using a ribbed weld track or weld flange. For example, dashed lines 93 outline a modified weld track having ribs 94 which follow the slanted radial profile. Each respective rib has a different height for following the slanted profile that is shared with complementary surface 91.

What is claimed is:

1. An active bolster for providing an interior trim surface of an automotive vehicle, comprising:
    a plastic-molded outer trim panel having a welding track on an inside surface; and
    a plastic-molded expandable bladder member having a central attachment section configured to attach to a support structure of the vehicle, a welding flange along a peripheral edge with a first surface facing the trim panel inside surface and a second opposed surface, and a pleated region between the central attachment section and the welding flange, wherein the welding track and the welding flange are joined by a closed-loop hot weld seam to form a sealed chamber;
    wherein the welding track and welding flange comprise complementary surfaces being slanted to add a shear force component.

2. The active bolster of claim 1 the complementary surfaces have a plurality of corrugations making the weld seam at least partially shaped as an undulating ribbon.

3. The active bolster of claim 2 wherein the corrugations have a continuously changing slope.

4. The active bolster of claim 3 wherein the corrugations are sinusoidal.

5. The active bolster of claim 2 wherein the corrugations are substantially sinusoidal with truncated peaks and valleys.

6. The active bolster of claim 2 wherein the corrugations are comprised of triangular prisms.

7. The active bolster of claim 2 wherein the corrugations of one of the welding track or the welding flange include a plurality of ribs.

8. The active bolster of claim 2 wherein the corrugations of one of the welding track or the welding flange include a plurality of pits.

9. An active bolster comprising:
    a trim panel having a thermoplastic welding track; and
    a pleated bladder member attachable to a vehicle and including a thermoplastic flange hot welded with the welding track forming a sealed chamber;
    wherein the welding track and welding flange comprise complementary surfaces having a plurality of corrugations whereby a majority of the weld seam extends non-perpendicularly to a direction of gas expansion of the chamber.

10. The active bolster of claim 9 wherein the corrugations have a continuously changing slope.

11. The active bolster of claim 10 wherein the corrugations are sinusoidal.

12. The active bolster of claim 9 wherein the corrugations are substantially sinusoidal with truncated peaks and valleys.

13. The active bolster of claim 9 wherein the corrugations are comprised of triangular prisms.

14. The active bolster of claim 9 wherein the corrugations of one of the welding track or the welding flange include a plurality of ribs.

15. The active bolster of claim 9 wherein the corrugations of one of the welding track or the welding flange include a plurality of pits.

16. A method of manufacturing an inflatable bladder for an active bolster, comprising the steps of:
    molding a plastic trim panel having a welding track on an inside surface;

molding a plastic bladder member having a central attachment section configured to attach to a reaction surface, a welding flange along a peripheral edge with a flange surface facing the trim panel inside surface, and a pleated region between the central attachment section and the welding flange, wherein the inside surface and the flange surface form a complementary closed loop that is slanted to add a shear force component;

heating the weld flange and the welding track to melt plastic material at the complementary surfaces; and compressing the welding flange against the welding track to form a hot weld shaped as an undulating ribbon.

17. The method of claim 16 wherein the surfaces include a plurality of corrugations along at least a portion of the closed loop.

18. The method of claim 16 wherein the closed loop is radially slanted.

\* \* \* \* \*